United States Patent [19]

O'Neil

[11] Patent Number: 5,655,912

[45] Date of Patent: Aug. 12, 1997

[54] WIRING BLOCK SYSTEM WITH COLOR CODED BACKBOARD SUPPORT

[76] Inventor: William E. O'Neil, 21 Darlington Pl., Vallejo, Calif. 94590

[21] Appl. No.: 531,622

[22] Filed: Sep. 21, 1995

[51] Int. Cl.[6] .................................................. H01R 29/00
[52] U.S. Cl. ............................................ 439/49; 379/326
[58] Field of Search .............................. 439/49, 488, 491; 29/857, 33 F, 755

[56] References Cited

U.S. PATENT DOCUMENTS 3,573,373   4/1971   Mullin et al. ............................ 179/98

OTHER PUBLICATIONS

Bell Lab Record, vol. 50, No. 7, pp. 217–221 dated Aug. 1972.

Primary Examiner—David L. Pirlot
Assistant Examiner—Tho Dac Ta
Attorney, Agent, or Firm—Harold D. Messner

[57] ABSTRACT

A system for better organizing telephone termination tasks—off work site—for later use at the job site, comprises:
(i) a single colored planar backboard support member dedicated to particular type of termination task, and defining a first upper broad surface and a second under broad surface terminating in a series of vertically depending parametric end walls; (ii) one or more rows of spools attached to the first upper broad surface of the backboard support member off-site to provide for proper cable management routing therebetween at the job site, (iii) a series of terminal wiring blocks arranged in rows and/or columns mounted on the backboard support member off site, each of the wiring blocks including a planar base and a series of rows of upright fingers for effecting a selected termination purpose at a job site, and (iv) a series of fastening assemblies attached to and between the under surface of the base of each of the wiring blocks and the first upper broad surface of the planar backboard support member off-site whereby the under surface of the base of each of the wiring blocks is positioned a sufficient common height distance D above the first upper broad surface of the planar backboard support member to permit easy conductor intrusion at the job site but wherein.

16 Claims, 4 Drawing Sheets

WIRING BLOCK SYSTEM WITH COLOR CODED BACKBOARD SUPPORT

SCOPE OF THE INVENTION

This invention relates to terminal wiring blocks of cross connect hardware systems suitable for forming interconnections for two cables, for joining groups of conductors or for connecting branches from a large cable especially where such cables carry audio and digital data associated with telephone networks. More particularly, the invention relates to a system for arranging a series of wiring blocks in rows and columns on a planar color coded backboard support member in which the bases of the wiring blocks are positioned—off site—a sufficient common height distance D above the broad surface of the color coded backboard to permit easy conductor intrusion when used on-site for a given termination task but wherein fasteners for attachment of the blocks to the backboard do not inadvertently cause conductor snags and mars from fasteners.

DEFINITIONS

CROSS CONNECT HARDWARE SYSTEMS comprise wiring blocks, connecting blocks, patch cords and the label inserts used to terminate and interconnect telephone cables and to route circuits through a telephone network.

WIRING BLOCKS are each a one-piece plastic base on which cable conductor pairs terminate in slots between rows of upright fingers.

CONNECTING BLOCKS are each a one-piece plastic housing containing solder-plated sharpened clip ends that can be installed and removed by use of a special tool to connect a selected number of gauged conductors positioned within the slots of each wiring block without need to remove their insulation. Connecting blocks are sized in 3-, 4- and 5-pair sizes, mechanically attach to the fingers of the wiring blocks and electrical interconnect the terminated conductors on the wiring blocks to a hook-up wire or patch cords positioned opposite to the clip ends.

COLOR CODE TASK IDENTIFICATION AND ASSEMBLY relates to associating—off site—a color code to the on-site function of the wiring blocks and thereafter, assembling—off site—the wiring blocks in rows and columns on a selected color coded backboard support, wherein the color code and task are selected off—site from among the following:

- Blue to identify wiring blocks to be used to terminate cable conductors leading toward the user's key telephone system;
- Green to identify wiring blocks to be used to terminate cable conductors leading toward the central office of the telephone network;
- Red to identify wiring blocks to be used to terminate cable conductors leading toward and from key telephone equipment, such as key telephone sets;
- Yellow to identify wiring blocks to be used to terminate cable conductors leading toward and from special service equipment, such as fax machine, answering machines, computers, etc;
- Purple to identify wiring blocks to be used to terminate cable conductors leading toward and from PBX equipment;
- White to identify wiring blocks to be used to terminate cable conductors that permit routing of cross connected conductors for conductor management purposes.

BACKGROUND OF THE INVENTION

In providing telephone service to new or existing businesses, large numbers of terminal wiring blocks are used in forming or joining groups of conductors that carry audio and digital data associated with telephone networks. For a given geographical site, these tasks can be organized as follows. For example, the field engineers can break down project requirements into a series of bills of materials, purchase the needed equipment associated with each listing, and then transport all equipment to the work site for assembly. To avoid work stoppage at the work site, engineers often over-order equipment, creating stowage problems after the project is completed.

Cross connect hardware systems provide for relatively fixed or permanent but changeable interconnections among a large number of conductors within the work site. Since each project can be organized by task, the terminal wiring blocks can be provided with display cards in which indicia can be affixed to identify the task associated with a given wiring block. For example, indicia can identify conductors leading to one of the following: the user's key telephone sets, the network's central office, key telephone equipment, PBX equipment, special service equipment and cross-connected inter-positioned equipment.

In a typical work site example, a cable containing a large number of conductor pairs is terminated at one or more terminal wiring blocks and additional conductors are installed to fan out from such blocks to the equipment listed above, say to the user's key telephone sets. It would be advantageous to the installers to reduce the number of assembly steps that are performed at the job site. To this end, I am aware of wiring block and connector block assemblies organized by tasks as listed above, such wiring blocks each including curved legs for attachment to a flat surface or rack. However, I am not aware of a system that permits rows and columns of wiring blocks to be organized in rows and/or columns off-site on a color coded backboard member which identifies the termination task of the wiring blocks at the job site. More specifically, I am unaware of any such system which can terminate, the dedicated conductor pairs, a sufficient distance D above the broad surface of the backboard to permit easy conductor intrusion when assembly occurs at the job site but wherein fasteners for attachment of the blocks to the backboard do not inadvertently cause conductor snags and mars during on-job assembly.

SUMMARY

A system for better organizing telephone termination tasks-off work site-comprising the steps of:

(i) associating—off site—a color code to the on-site function or task assigned to a series of wiring blocks, such association involving selecting a color from among the following:

- Blue to identify wiring blocks to be used to terminate cable conductors leading toward the user's key telephone system;
- Green to identify wiring blocks to be used to terminate cable conductors leading toward the central office of the telephone network;
- Red to identify wiring blocks to be used to terminate cable conductors leading toward and from key telephone equipment, such as key telephone sets;
- Yellow to identify wiring blocks to be used to terminate cable conductors leading toward and from special service equipment, such as fax machine, answering machines, computers, etc;

Purple to identify wiring blocks to be used to terminate cable conductors leading toward and from PBX equipment;

White to identify wiring blocks to be used to terminate cable conductors that permit routing of cross connected conductors for conductor management purposes;

(ii) assembly—off site—the wiring blocks in rows and columns on a selected color coded backboard support in which the bases of the wiring blocks are positioned a sufficient common height distance D above the broad surface of the color coded backboard to permit easy conductor intrusion when used on-site for a given termination task but wherein fasteners for attachment of the blocks to the backboard do not inadvertently cause conductor snags and mars from fasteners; and (iii) transporting the assembly of step (ii) to the job site for use.

Prior to step (iii), supra, the assembly thereof comprises the following: (i) a color coded planar backboard support member dedicated to particular type of termination task selected from colors blue, green, red, purple, yellow and white wherein each support member includes a planar base of rectangular cross section of longitudinal length L1 and a transverse length L2 where L1 is about 17 inches and L2 is about 20 inches. The base defines first and second opposed broad surfaces terminating in a series of parametric end walls depending therefrom of common height distance D1 measured from the first broad surface to the tip of the end walls; (ii) one or more rows of spools attached to the first broad surface adjacent to at least one the end walls of the planar backboard support member to provide for routing of selected conductors onto the support member at the job site, (iii) a series of terminal wiring blocks arranged in rows and columns on the planar color coded backboard support member wherein each wiring block includes a planar base and a series of rows of finger pairs for a selected termination purpose, positioned a sufficient common height distance D above the broad first surface of the backboard to permit easy conductor intrusion but wherein fasteners for attachment of the blocks to the backboard do not inadvertently cause conductor snags and mars. Each base of each wiring block is rectangular cross section; the rows of fingers are positioned to cantilever from the base each defining a longitudinal axis of symmetry parallel to each other and wherein a vertical plane through each axis of symmetry bisects say (i) 25 sets of pairs of fingers of alternating heights and (ii) 25 slots between adjacent pairs of fingers to accept conductors. Each row terminates in a pair of upright posts having rectangularly shaped hats and at least one notch and define a longitudinal length L3 parallel to the axis of symmetry where L3 is about 8½ inches. A pair of lands are provided between mid-rows wherein each is formed with a recess and a vertical opening therethrough to accept a fastening assembly for attaching the wiring block to the backboard support member. Each fastening assembly includes a fastener and post of circular cross section to accept the fastener. The post has opposed ends which attach to the under surface of the base of each wiring block and to the first broad surface of the backboard support member to thereby define the height distance D heretofore mentioned.

DETAILED DESCRIPTION OF THE INVENTION

Figure 1:
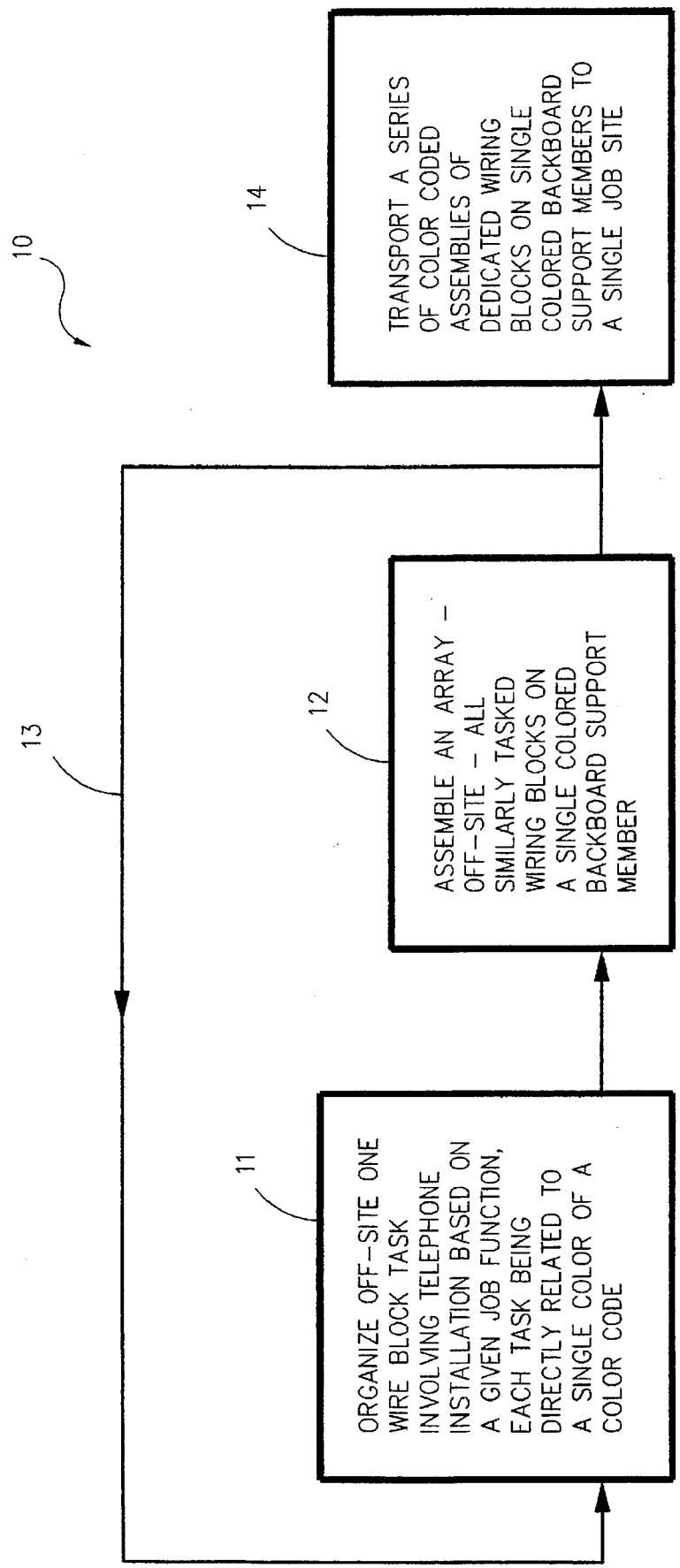
FIG. 1 is a flow chart illustrating the system of the invention for organizing cable conductor termination tasks off work site; relating the task to a selected color code; selecting a planar backboard support member identifying the task to the color code; assembling the wiring blocks in rows and columns of the selected backboard support member and then transporting the assembly to the job site.

FIG. 1 illustrates the system 10 of the invention useful in carrying out the purposes of the invention including but limited to associating—off site—a color code to proposed on-site function assigned to an array of the wiring blocks, not shown. As previously mentioned, such on-site function is associated with a given geographical work site.

At step 11, the field engineers break down project requirements into the work tasks to be provided by given arrays of wiring blocks. The wiring blocks for a given task are then associated—off site—with a color code that is directly related termination function or task assigned to such array of wiring blocks. Such association or groupings of wiring blocks involves selecting a color from among the following color code:

Blue to identify wiring blocks to be used to terminate cable conductors leading toward the user's key telephone system;

Green to identify wiring blocks to be used to terminate cable conductors leading toward the central office of the telephone network;

Red to identify wiring blocks to be used to terminate cable conductors leading toward and from key telephone equipment, such as key telephone sets;

Yellow to identify wiring blocks to be used to terminate cable conductors leading toward and from special service equipment, such as fax machine, answering machines, computers, etc;

Purple to identify wiring blocks to be used to terminate cable conductors leading toward and from PBX equipment;

White to identify wiring blocks to be used to terminate cable conductors that permit routing of cross connected conductors for conductor management purposes.

At step 12, the off-site engineers then assemble—still off site—the array of wiring blocks associated with a given termination task on an associated color coded backboard support. Preferably, the array of wiring blocks are positioned in rows and columns wherein the planar bases of the wiring blocks are positioned a selected common height distance D above the broad surface of the backboard using a series of fastening assemblies. Purpose of the distance D: to permit easy conductor intrusion when the array of wiring blocks are used on-site for a given termination task. Note that the fastening assemblies used for attachment of the wiring blocks to the backboard do not inadvertently cause conductor snags and mars, as explained in detail below.

Thereafter step 12 can be repeated via iteration step 13 for a different termination task using a different color coded backboard support. After all tasks for a given phase of the project have been completed, the assemblies of steps 12 and 13 are then transported to the job site for use, as shown in step 14.

FIGS. 2–10 illustrate the combination of wiring blocks and color coded backboard supports of step 12 and 13 in more detail.

Figure 2:
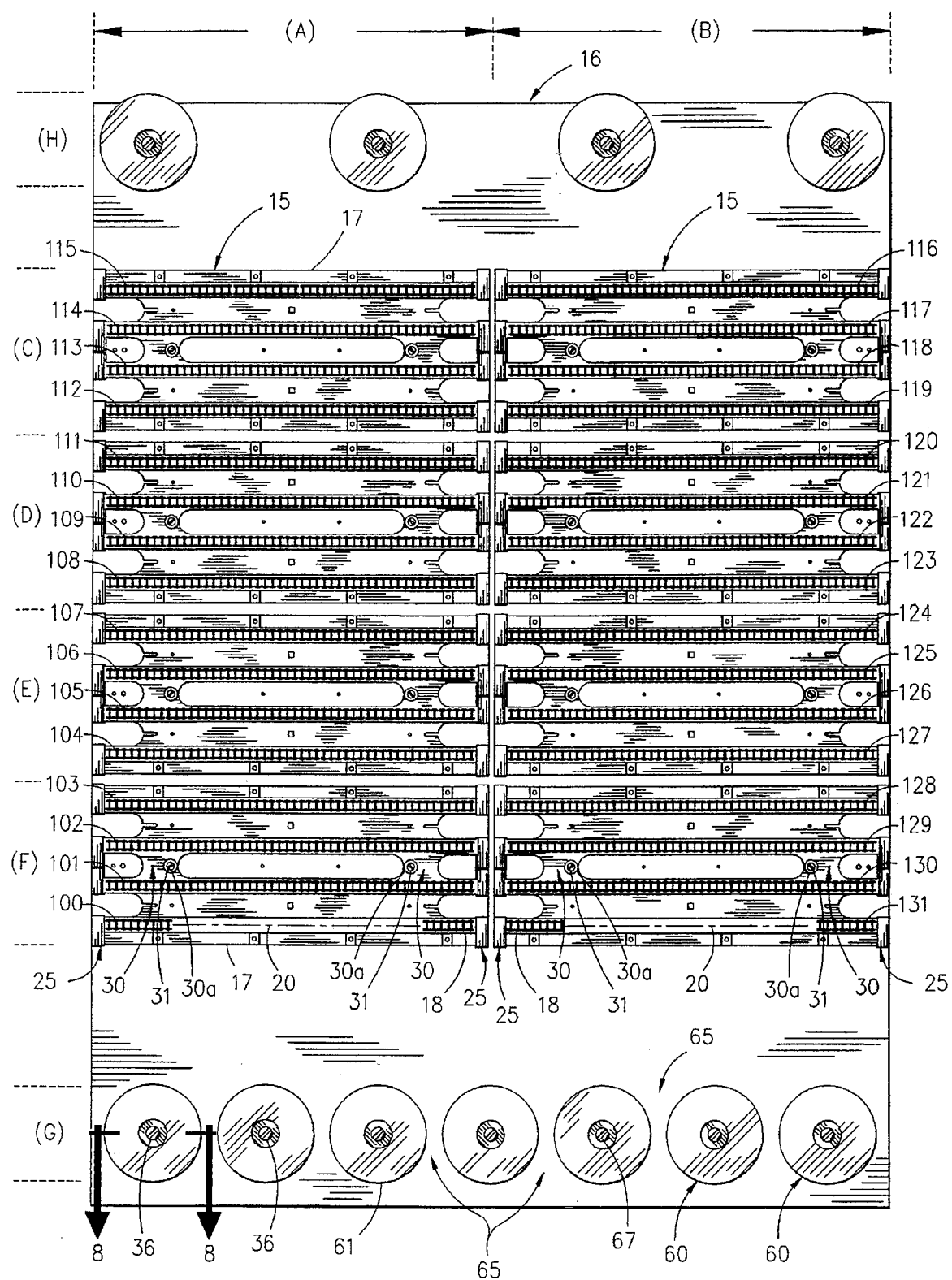
FIGS. 2 and 3 are top and front views, respectively, of an assembly of wiring blocks mounted on a color coded backboard support member prior to transporting such assembly to the job site using a series of fastening assemblies, such backboard support member seen to be also carrying thereon a series of routing spools, in which the rows of fingers of each wiring block is seen to terminate in a pair of posts.
Figure 3:
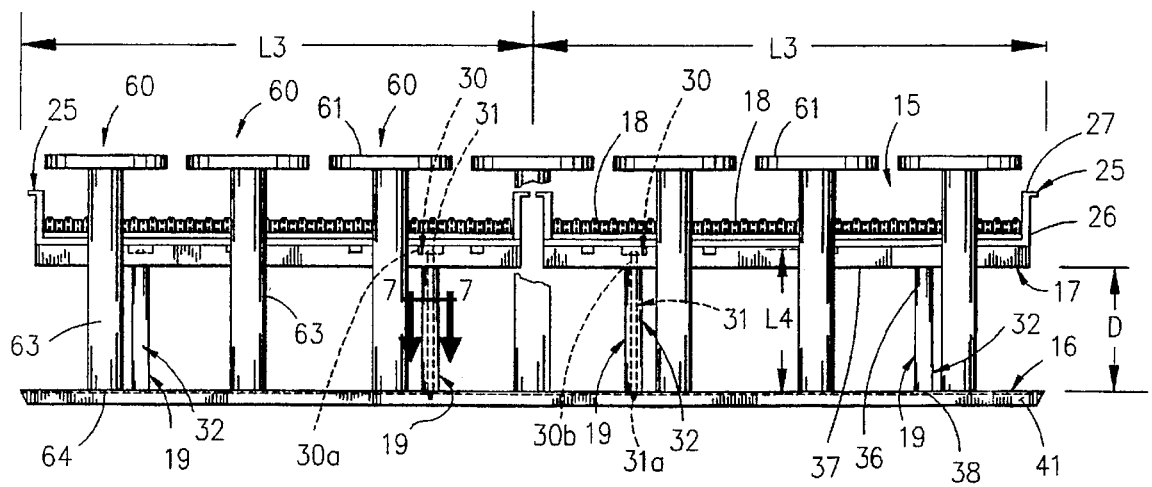

As shown in FIGS. 2 and 3, single tasked wiring blocks 15 are mounted to associated color coded backboard support member 16 in a column-row array, i.e., the wiring blocks 15 are aligned in columns (A) and (B) and in rows (0), (D), (E) and (F) atop a pre-selected color coded backboard support member 16. As previously discussed, the color of the support member 16 corresponds to the termination task assigned off-site to the array of single tasked wiring blocks 15. As mentioned, such color is selected from blue, green, red, purple, yellow and white wherein each such code is associated with a given termination task, as previously mentioned.

Each integral wiring block 15 includes planar base 17 (FIG. 3) formed with four rows of upright latching fingers 18, as generally described in detail in U.S. Pat. No. 5,352, 136. All of the rows of upright latching fingers 18 of all the arrayed wiring blocks 15 of FIGS. 2, are individually numbered 100–131 as shown. While the rows 100–131 of latching fingers 18 of FIG. 2, are conventional as shown in U.S. Pat. No. 5,352,136, note the single tasked wiring blocks 15 of the invention do not have curved support legs there depicted, but instead use fastening assemblies 19 for that function, see FIG. 3.

Figure 4:
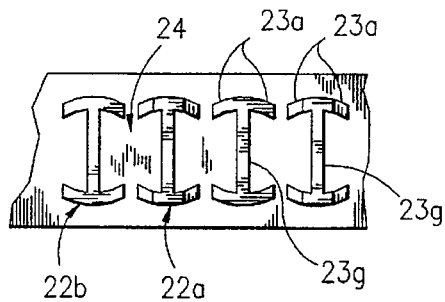
FIGS. 4 and 5 are detail top and side views, respectively of two pair of fingers of the wiring block of the assembly of FIGS. 2 and 3.
Figure 5:
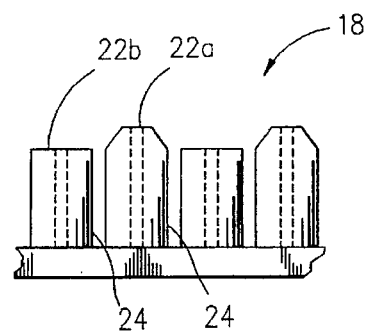

Briefly, each base 17 of each wiring block 15 is rectangular in cross section. Each of the rows 100–131 of fingers 18 include a longitudinal axis of symmetry 20 that are parallel to each other as well as to the rows (C), (D), (E) and (F) of wiring blocks 15. An imaginary vertical plane through each axis of symmetry 20 would be known to bisect twenty-five sets of pairs of latching fingers 18. Each pair of latching fingers 18 is seen in FIGS. 4 and 5 to include a domed member 22a positioned adjacent to a plug member 22b. Each latching finger 18, however is I-shaped in cross section to define curved side arms 23a and a transverse arm 23b. Note that between the latching fingers 18 is a series of slots 24 which accept—at the job site—cable conductors for the termination task assigned to the assemblage of wiring blocks 15 and color coded backboard support 16 depicted in FIGS. 2–10.

Figure 6:
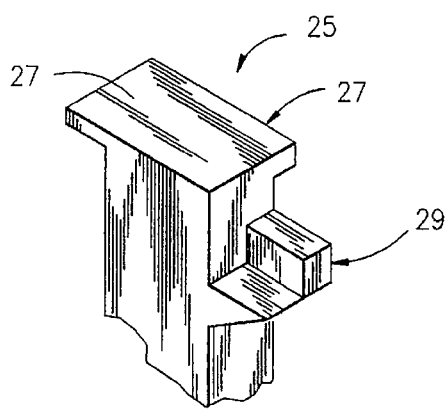
FIG. 6 is a detail perspective view of a post of the wiring block of the assembly of FIGS. 2 and 3.
Figure 7:
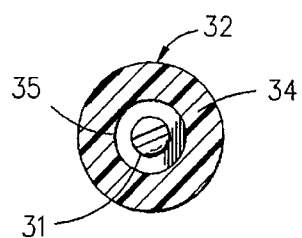
FIG. 7 is a section taken along line 7—7 of FIG. 3 showing the fastening assembly used to secure the wiring block to the color coded backboard support member of the assembly of FIGS. 2 and 3.
Figure 8:
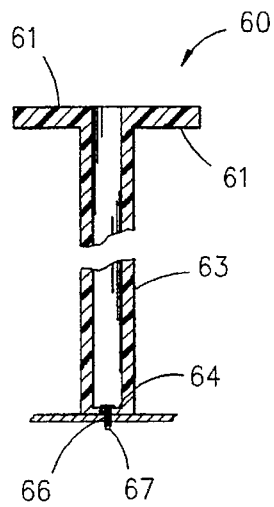
FIG. 8 is a section taken along line 8—8 of FIG. 2 showing attachment of one of the routing spools relative to the backboard support member.

In addition, note that the previously mentioned imaginary vertical plane through each axis of symmetry 20 of the rows of fingers 18 also bisects the slots 24 between the fingers 18, as well as intersects a pair of T-posts 25 at the ends of each row of fingers 18. As shown in FIGS. 3 and 6, each T-post 25 is rectangular in cross section and includes an end segment 26 attached to the planar base 17 of the wiring block 15 and a cantilevered segment 27 remote form the planar base 17. The cantilevered segment 27 is provided with hat section 28 (FIG. 6) and a notch section 29 for fastening purposes understood in the art. Length L3 (FIG. 3) between T-posts 25 of any one row of fingers 18 is constant and is equal to about 8½ inches. Symmetry of operations at the job site, is thus assured.

Returning to FIG. 3, note that each wiring block 15 is supported above the color coded support member 16 by fastening assemblies 19, previously mentioned. Each wiring block 15 includes a pair of fastening assemblies 19 wherein the pair of fastening assemblies 19 for each wiring block 15 is longitudinally aligned. However, each fastening assembly 19 is vertically aligned with a land 30 formed in the base 17 of the wiring block 15, the lands 30 for each wiring block 15 being formed between the two mid rows of each wiring block 15. Each land 30 is provided with a cavity 30a and an opening 30b. As a result, a conventional screw fastener 31 can pass through the land 30, thence through cylindrical post 32 of annular cross section and attach to the color coded support member 16, as shown in FIG. 3. In that way, the fastening assemblies 19 fixedly attach each wiring block 15 above the color coded support member 16 a fixed vertical distance D where D is about 1½ inches.

Thus to recapitulate, each fastener assembly 19 includes screw fastener 31 and post 32 of annular cross section. The post 32 thus includes a side wall 34, see FIG. 7, having a cavity 35 in vertical alignment with the opening 30b in the land 30 into which screw fastener 31 resides. Upper end 36 of the post 32 is attached to under surface 37 of the base 17 of each wiring block 15 and a lower end 38 that is attached to the color coder backboard support member 16 thereby define the height distance D heretofore mentioned. In addition, the length L4 of the screw fastener 31 is engineered so that its tip segment 31a does not penetrate beyond the termini of the color coded backboard support member 16, as explained below.

Figure 9:
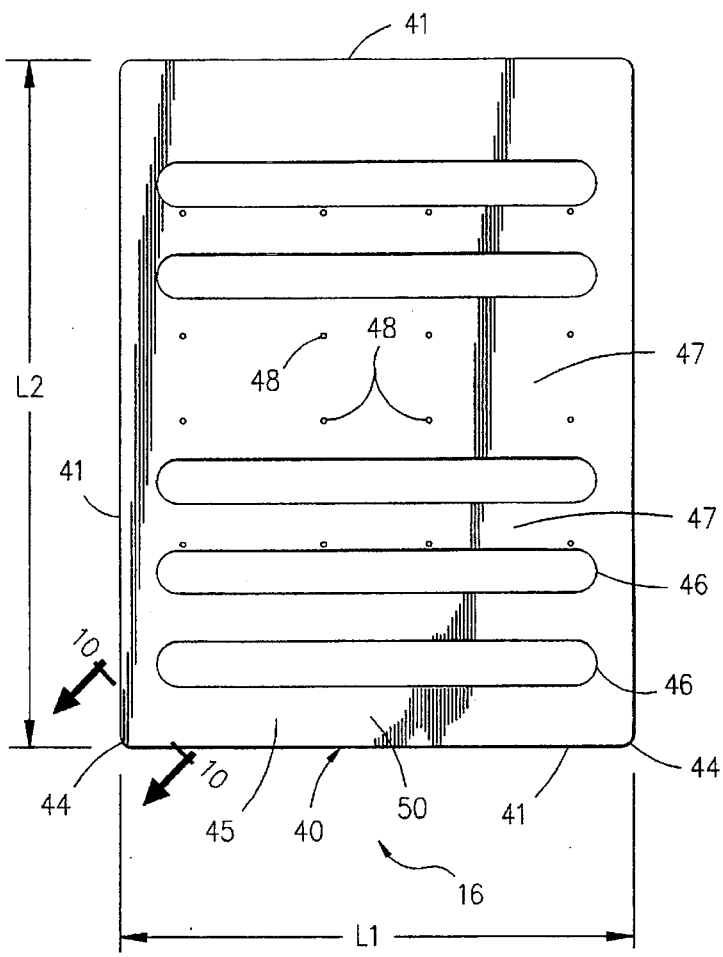
FIG. 9 is a top view of the color coded backboard support member of the assembly of FIGS. 2 and 3.
Figure 10:
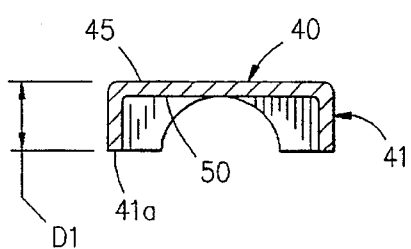
FIG. 10 is a section taken along line 10—10 of FIG. 9.

FIGS. 9 and 10 show the color coded backboard support member 16 in detail.

As shown, color coded backboard support member 16 is dedicated to a particular type of termination task assigned to the wiring blocks to be supported thereon and has a color selected from colors blue, green, red, purple, yellow and white to pinpoint such task.

In detail, the backboard support member 16 includes a planar base 40. The planar base 40 is of a rectangular cross section so as to define a longitudinal length L1 and a transverse length L2 where L1 is about 17 inches and L2 is about 20 inches. The planar base 40 terminates in parametric end walls 41, see FIGS. 3 and 10, intersecting each other at corners 44. As shown in FIG. 3, the base 40 of the backboard support member 16 includes an upper, broad surface 45 to which lower ends 38 of the posts 32 of the fastening assemblies 19 terminate. Such upper broad surface 45 faces vertically upward, is opposed to the orientation of the ends walls 41 and includes a series of indentations 46 and a series of islands 47. Within the islands 47 are a series of openings 48 for the purpose of accerting the screw fasteners 31 of the fastening assemblies 19, as explained above.

The planar base 40 of the backboard support member 16 also includes an under surface 50 opposite to upper broad surface 45. As shown in FIG. 10, such under broad surface 50 is the structure from which the parametric end walls 41 downwardly depend, wherein such end walls 41 define a common height distance D1 measured from the under broad surface 50 to tip 41a of the end walls 41 where distance D1 is equal to about 7/16 inch. Returning to FIGS. 2 and 3, note that the length L4 of the screw fastener 31 is engineered so that its tip segment 31a does not penetrate beyond the tip 41a of the end walls 41 of the backboard support member 16. That is, a horizontal plane through the tip segment 31a of the screw fastener 31 always lies between similar horizontal planes through (i) under surface 50 of the backboard support member 16 and (ii) tip 41a of the end walls 41 of the backboard support member 16. In that way, the screw fasteners 31 do not inadvertently cause conductor snags and mars at the job site.

Still focusing on FIGS. 2 and 3, note that positioned to upper surface 45 of the backboard support member 16 is a series of routing spools 60 positioned in rows (G) and (H). Each spool 60 is T-shaped in cross section and includes a lateral arm 61 and upright transverse arm 63. As shown best in FIG. 8, the transverse arm 63 terminates in an end wall 64. As shown, attachment of each spool 60 to the planar base 40 of the backboard support member 16, is via fasteners 67 that extend through openings 66 in the end wall 64. Purpose of the routing spools 60: to provide openings 65 between neighboring spools 60 for routing of conductors onto the support member 16 and thence to the wiring blocks 15 at the job site.

While preferred embodiments of the invention has been shown and described, various modifications and substitutions may made thereto by those skilled in the art without departing from the s spirit and scope of the invention. Accordingly, it will be understood that the present invention has been described by way of illustration only and not limitation.

What is claimed is:

1. A system for better organizing telephone termination tasks—off site—, comprising
    (i) a single colored planar backboard support member dedicated to particular type of termination task, said backboard support member including a planar base of rectangular cross section of longitudinal length L1 and a transverse length L2, said planar base of said backboard support member defines a first upper broad surface and a second under broad surface terminating in a series of vertically depending parametric end walls depending therefrom of common height distance D1 measured from said second under broad surface to the termini of said end walls;
    (ii) one or more rows of spools attached to the first upper broad surface of said planar backboard support member off-site from a job site adjacent to at least one of said end walls to provide for cable management routing therebetween at said job site.
    (iii) a series of terminal wiring blocks arranged in rows and/or columns mounted on said single colored planar backboard support member off-site from said job site, each of said wiring blocks including a planar base and a series of rows of upright fingers for effecting a selected termination purpose at said job site, said planar base of each of said wiring blocks including an under surface facing said first upper broad surface of said backboard support member,
    (iv) a series of fastening assemblies attached to and between said under surface of said base of each of said wiring blocks and said first upper broad surface of said planar backboard support member off-site from said job site whereby said under surface of said base of each of said wiring blocks is positioned a sufficient common height distance D above said first upper broad surface of said planar backboard support member to permit easy conductor intrusion at said job site even though assembly of said one or more rows of spools, said series of terminal wiring blocks, and said series of fastening assemblies relative to said single colored planar backboard support member, all must occur off-site.

2. The system of claim 1 in which D is equal to about 1½ inches.

3. The system of claim 1 wherein each of said fastening assemblies, includes an annular post of length distance D having an upper end in mating contact with said under surface of said planar base of said backboard support member, a central cavity aligned with an opening through said planar base of each of said wiring blocks and a screw fastener extending through said planar base of said backboard support member, through said central cavity of said annular post and thence into and through said first upper and said second lower broad surface of said backboard support member terminating in a tip segment.

4. The system of claim 3 in which said tip segment of each of said screw fastener of each of said fastening assemblies terminates in a plane that is between planes through (i) said lower broad surface of said backboard support member and (ii) said tip of said end walls of said backboard support member, whereby said tip segment do not inadvertently cause conductor snags and mars at the job site.

5. The system of claim 1 in which where L1 is about 17 inches and L2 is about 20 inches.

6. The system of claim 5 in which said each row of each of said series of wiring blocks terminate in a pair of upright T-posts each defining a L3 parallel to said length L1 of said backboard support member.

7. The system of claim 6 in which L3 is equal to about 8½ inches.

8. The system of claim 1 in which said single colored backboard support member has a color selected from the group comprising blue, green, red, purple, yellow and white.

9. The system of claim 8 in which said single color backboard support member is associated with a single selected termination task provided by said series of wiring blocks.

10. The system of claim 9 in which said single selected termination task is selected from the group comprising (a) terminating cable conductors leading toward the user's key telephone system; (b) terminating cable conductors leading toward the central office; (c) terminating cable conductors leading toward and from key telephone equipment, such as key telephone sets; (d) terminating cable conductors leading toward and from special service equipment, such as fax machine, answering machines and computers; (e) terminating cable conductors leading toward and from PBX equipment; and (f) terminating cable conductors that permit routing of cross connected conductors for conductor management purposes.

11. A system for better organizing telephone termination tasks—off site—, comprising
    (i) a single colored planar backboard support member dedicated to particular type of termination task, said backboard support member including a planar base of rectangular cross section of longitudinal length L1 and a transverse length L2, said planar base of said backboard support member defines a first upper broad surface and a second under broad surface terminating in a series of vertically depending parametric end walls depending therefrom of common height distance D1 measured from said second under broad surface to the termini of said end walls;
    (ii) a series of terminal wiring blocks arranged in rows and/or columns mounted on said single colored planar backboard support member off-site from said job site, each of said wiring blocks including a planar base and a series of rows of upright fingers for effecting a selected termination purpose at a job site, said planar base of each of said wiring blocks including an under surface facing said first upper broad surface of said backboard support member, (iv) a series of fastening assemblies attached to and between said under surface of said base of each of said wiring blocks and said first upper broad surface of said planar backboard support member off-site from said lob site whereby said under surface of said base of each of said wiring blocks is positioned a sufficient common height distance D above said first upper broad surface of said planar backboard support member to permit easy conductor intrusion at said job site even though assembly of series of terminal wiring blocks and said series of fastening assemblies relative to said single colored planar backboard support member, must occur off-site.

12. The system of claim 11 with the addition of one or more rows of spools attached to the first upper broad surface of said planar backboard support member adjacent to at least one of said end walls to provide for cable management routing therebetween at the job site.

13. The system of claim 11 in which D is equal to about 1½ inches.

14. The system of claim 11 wherein each of said fastening assemblies, includes an annular post of length distance D having an upper end in mating contact with said under surface of said planar base of said backboard support member, a central cavity aligned with an opening through said planar base of each of said wiring blocks and a screw fastener extending through said planar base of said backboard support member, through said central cavity of said annular post and thence into and through said first upper and said second lower broad surface of said backboard support member terminating in a tip segment.

15. The system of claim 14 in which said tip segment of each of said screw fastener of each of said fastening assemblies terminates in a plane that is between planes through (i) said lower broad surface of said backboard support member and (ii) said tip of said end walls of said backboard support member, whereby said tip segment do not inadvertently cause conductor snags and mars at the job site.

16. The system of claim 14 in which D is equal to about 1½ inches.

* * * * *